US006773753B2

(12) United States Patent
Anderson et al.

(10) Patent No.: US 6,773,753 B2
(45) Date of Patent: Aug. 10, 2004

(54) PROCESS FOR TREATING A COATED GAS TURBINE PART, AND COATED GAS TURBINE PART

(75) Inventors: Gordon Anderson, Baden (CH); Reinhard Fried, Nussbaumen (CH); Michael Loetzerich, Horheim (DE); Markus Oehl, Waldshut-Tiengen (DE); Stefan Schlechtriem, Taegerig (CH); Joerg Stengele, Ruetihof (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/211,352

(22) Filed: Aug. 5, 2002

(65) Prior Publication Data

US 2003/0035968 A1 Feb. 20, 2003

(30) Foreign Application Priority Data

Aug. 14, 2001 (CH) ............................................. 1499/01

(51) Int. Cl.[7] ........................... B32B 15/00; F03B 3/12; B05D 3/12

(52) U.S. Cl. ....................... 427/355; 428/469; 428/141; 428/212; 428/220; 428/409; 428/702; 416/241 B; 427/368

(58) Field of Search ................................ 427/355, 358; 451/28; 29/23.51, 890.01; 216/52; 428/469, 156, 141, 166, 195, 210, 212, 220, 409, 697, 699, 701, 702; 416/241 B, 96 R, 96 A

(56) References Cited

U.S. PATENT DOCUMENTS

| | | | | |
|---|---|---|---|---|
| 3,528,861 | A | | 9/1970 | Elam et al. |
| 4,055,705 | A | | 10/1977 | Stecura et al. |
| 4,248,940 | A | | 2/1981 | Goward et al. |
| 4,321,311 | A | | 3/1982 | Strangman |
| 4,576,874 | A | | 3/1986 | Spengler et al. |
| 4,585,481 | A | | 4/1986 | Gupta et al. |
| 4,676,994 | A | | 6/1987 | Demaray |
| 5,209,644 | A | * | 5/1993 | Dorman |
| 5,484,980 | A | * | 1/1996 | Pratt et al. |
| 5,894,053 | A | | 4/1999 | Fried |
| 5,972,424 | A | | 10/1999 | Draghi et al. |
| 6,004,102 | A | * | 12/1999 | Kuefner et al. |
| 6,180,260 | B1 | * | 1/2001 | Gray et al. |

FOREIGN PATENT DOCUMENTS

| | | |
|---|---|---|
| EP | 0441095 A2 | 8/1991 |
| EP | 0937787 A1 | 8/1999 |
| EP | 1081332 A1 | 3/2001 |
| EP | 1088908 A2 | 4/2001 |
| GB | 580806 | 9/1946 |
| GB | 1579349 | 11/1980 |
| WO | 97/21907 | 6/1997 |

* cited by examiner

*Primary Examiner*—Jennifer McNeil
(74) *Attorney, Agent, or Firm*—Burns, Doane, Swecker & Mathis, L.L.P.

(57) ABSTRACT

The invention discloses a process for treating a ceramic protective layer (3) which is applied to the surface (2) of a gas turbine part (1). The roughness of the ceramic protective layer (3) is reduced at at least one first location (5), and the original roughness is retained at at least one second location (6). The roughness is advantageously retained at locations (6) on a turbine blade or vane (1) which are at risk of detachment, while the roughness of the remaining surface (2) is reduced in order to reduce the heat transfer to the surrounding hot-gas flow.

10 Claims, 1 Drawing Sheet

PROCESS FOR TREATING A COATED GAS TURBINE PART, AND COATED GAS TURBINE PART

FIELD OF THE INVENTION

The invention relates to a process for treating a gas turbine part which has been coated with a ceramic protective layer and to a coated gas turbine part.

BACKGROUND OF THE INVENTION

It is generally known from numerous documents to provide turbine blades or vanes, i.e. guide vanes or rotor blades of gas turbines, with one or more protective layers in order to protect the turbine blade or vane from the thermal and mechanical loads, oxidation and other harmful influences which occur during operation and to extend the service life of the turbine blade or vane in this way. A first protective layer on the turbine blade or vane generally consists of a metallic alloy, such as MCrAlY, where M represents Ni, Co or Fe. This type of metallic coating is used to protect against oxidation. A second, rougher coating comprising MCrAlY is applied to the first layer using different coating parameters. This layer is also known as a bond coating. Coatings of this type are known from numerous documents in the prior art, for example from U.S. Pat. No. 3,528,861 or U.S. Pat. No. 4,585,481.

Moreover, a further protective layer of TBC (Thermal Barrier Coating), which consists of a ceramic material (Y-stabilized Zr oxide) and is used as thermal protection, is applied. Ceramic coatings and coating methods are known, for example, from the documents EP-A2-441 095, EP-A1-937,787, U.S. Pat. Nos. 5,972,424, 4,055,705, 4,248,940, 4,321,311, 4,676,994, 5,894,053. The applied protective layers generally have a relatively high surface roughness. However, this surface roughness has a positive influence on the heat transfer, so that increasing roughness increases the thermal load on the base material. To avoid this, a process for smoothing the surface is known, for example, from EP-A2-1 088 908. On the other hand, however, a ground surface has an adverse effect on the flow characteristics and in particular the detachment characteristics.

SUMMARY OF THE INVENTION

It is an object of the invention to provide a process which allows the heat transfer to the hot gas from a gas turbine part which is coated with a ceramic protective layer around which a hot gas flows to be reduced, so that improved protection of the base material of the gas turbine part is achieved. At the same time, the flow characteristics around the gas turbine part and therefore the efficiency of the overall installation are to be positively influenced. A further object is to produce a corresponding gas turbine part using this process.

According to the invention, in a process as described herein, this object is achieved by the fact that the roughness of the ceramic layer which has already been applied to the base material is reduced at at least one first location, and the original roughness of the ceramic layer is retained at at least one second location.

The invention also consists in a gas turbine part which is produced using the process according to the invention, in which the roughness of the ceramic protective layer is reduced compared to the original average roughness at at least one first location on the surface, and the original roughness of the ceramic protective layer is retained at at least one second location on the surface.

In principle, it is possible to reduce the roughness by grinding, sand-blasting, polishing, smoothing, brushing or in other suitable ways which are known from the prior art.

In a particular embodiment, the gas turbine part is a turbine blade or vane which is coated with Y-stabilized Zr oxide.

To positively influence the detachment characteristic at the surface of the turbine blade or vane, the roughness can be retained only at at least one location of the turbine blade or vane which is remote from the flow, while the remaining surface area of the turbine blade or vane is ground smooth. In this way, the heat transfer at the parts of the surface which have been ground smooth is advantageously reduced, so that the heat transfer deteriorates at these locations and the cooling of the base material is improved for the same cooling capacity. However, at locations at which there is a risk of flow detachment, the ceramic protective layer remains rough, so that at these locations a certain turbulence is generated and the flow remains in place for a longer time. These simple measures advantageously increase the efficiency of the entire installation.

BRIEF DESCRIPTION OF THE DRAWINGS

The invention is explained in more detail with reference to the appended figures, in which.

Only the elements which are pertinent to the invention are illustrated. Identical elements in different figures are provided with the same reference symbols. Directions of flow are indicated by arrows.

DETAILED DESCRIPTION OF THE INVENTION

Figure 1:
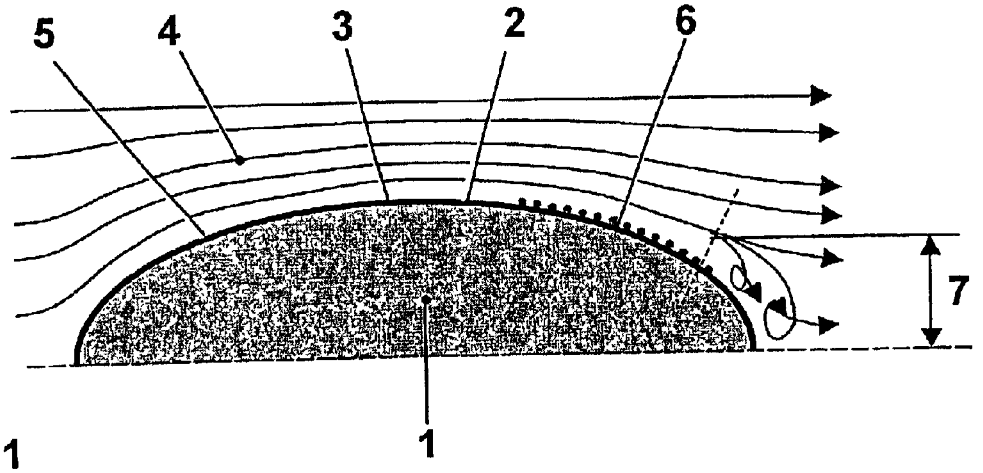
FIG. 1 shows a section through a turbine blade or vane which has been treated using the process according to the invention.

FIG. 1 diagrammatically depicts a section through a turbine blade or vane 1 of a gas turbine. The turbine blade or vane 1 has been coated with a ceramic protective layer 3 at the surface 2. The ceramic protective layer 3 (Thermal Barrier Coating, TBC), which is Y-stabilized Zr oxide, is used to protect against the hot gas 4 which flows around the turbine blade or vane 1 and the flow lines of which are visible in FIG. 1.

Ceramic coatings and coating processes of this type are known, for example, from the documents EP-A2-441 095, EP-A1-937,787, U.S. Pat. Nos. 5,972,424, 4,055,705, 4,248, 940, 321,311, 4,676,994, 5,894,053. It is known that the applied protective layer has a certain surface roughness.

Therefore, according to the invention it is proposed to reduce the roughness of the ceramic layer 3 which has already been applied at at least one first location 5 on the surface, while the roughness is retained to the extent in which it is present after the coating process at at least one second location 6. Therefore, by way of example, the average roughness ($R_a$) can be reduced at the first location 5 to at most ⅓ of the original average roughness. Therefore, the roughness $R_T$ will be reduced, for example, from approximately 50 $\mu$m to 20 $\mu$m. Such smoothing of the TBC surface reduces the heat transfer coefficient by 20% to 30%. This therefore results in a considerably improved protection of the base material 1 which is used against the hot gases 4 at these locations 5.

In principle, it is possible to reduce the roughness by grinding, sand-blasting, polishing, smoothing, brushing or in other suitable ways which are known from the prior art. Silicon carbide or diamonds which are plastic-bonded to strips or wheels, are particularly suitable for grinding.

In a first embodiment (FIG. 1), the roughness of the ceramic protective layer 3 can be retained at at least one location 6 which is remote from the flow and at which the hot-gas flow becomes detached. Therefore, overall the detachment region 7 will be smaller than when a completely smooth surface is used, since a certain turbulence, which counteracts the detachment, is retained at the location 6 which is at risk of detachment.

The remaining ceramic protective layer 3 is ground smooth in order to reduce the heat transfer, i.e. its roughness is reduced to at most ⅓ of the original roughness. In practice, this means that the average roughness $R_a$ is less than 5 $\mu$m. Therefore, at the parts of the surface which have been ground smooth, the heat transfer is advantageously reduced, so that the heat transfer deteriorates further at these locations, and therefore the cooling of the base material is improved for the same cooling capacity.

These simple measures advantageously increase the efficiency of the entire installation.

Figure 2:
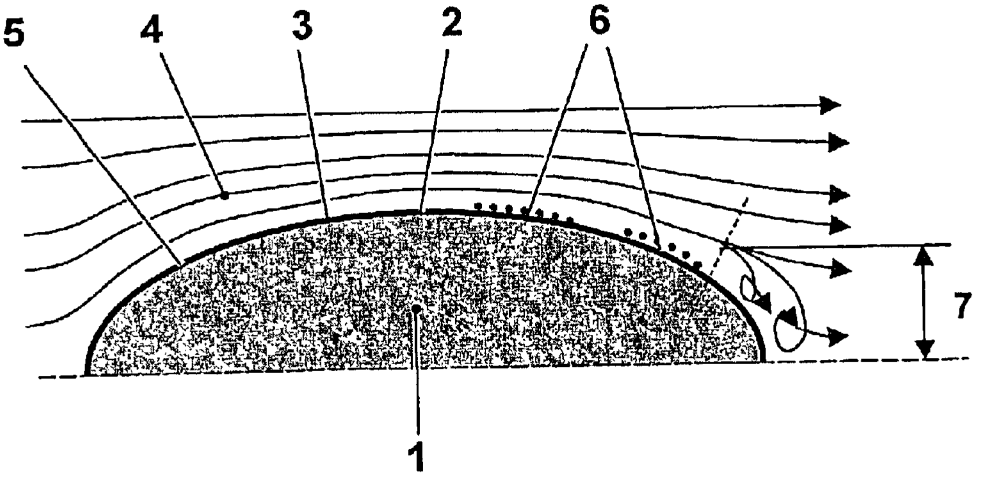
FIG. 2 shows a section through a second embodiment of a turbine blade or vane which has been treated using the process according to the invention.

In the second embodiment of the turbine blade or vane 1 shown in FIG. 2, the roughness of the ceramic protective layer 3 is retained at various locations 6 on the side of the turbine blade or vane 1 which is remote from the flow. However, the locations 6 are not linked, but rather are independent of one another. This measure serves to have a further positive effect on the detachment characteristic. Between these locations 6, the roughness is completely reduced again in order to reduce the heat transfer.

The invention is not restricted to the exemplary embodiments described, but rather relates in general terms to gas turbine parts 1 which are coated with a ceramic protective layer 3.

LIST OF REFERENCE SYMBOLS

1 Turbine blade or vane, gas turbine part

2 Surface of the turbine blade or vane 1

3 Ceramic protective layer

4 Hot gas

5 Treated locations of the protective layer 3

6 Untreated locations of the protective layer 3

7 Detachment region

What is claimed is:

1. A process for treating a ceramic protective layer which is applied to the surface of a side of a gas turbine part exposed to a hot gas flow, the ceramic protective layer having a certain roughness after it has been applied to the gas turbine part, wherein the roughness of the ceramic layer which has already been applied to the base material is reduced at at least one first location of the surface of the side where the hot gas flow is not at risk of detachment, and the original roughness of the ceramic layer is retained at at least one second location of the surface of the side where the hot gas flow is at risk of detachment.

2. The treating process as claimed in claim 1, wherein the roughness of the applied ceramic layer is reduced at the first location to at most ⅓ of the original average roughness.

3. The treating process as claimed in claim 1, wherein the gas turbine part is a turbine blade or vane having a suction side and a pressure side, and the roughness is retained only at at least one location on the surface of the suction side or pressure side of the turbine blade or vane which is remote from a hot gas flow that is at risk of detachment, while the roughness is reduced on the remaining surface area of the suction side or pressure side of the turbine blade or vane.

4. The treating process as claimed in claim 3, wherein the gas turbine part is coated with Y-stabilized Zr oxide.

5. The treating process as claimed in claim 1, wherein the roughness is reduced by grinding, sand-blasting, polishing, smoothing, brushing or in some other suitable way.

6. A gas turbine part having a ceramic protective layer, the protective layer, after it has been applied to the gas turbine part having a certain roughness, produced using the process as described in claim 1, wherein the roughness of the ceramic protective layer is reduced compared to the original average roughness at at least one first location on the surface of a side where there is no risk of detachment of a hot gas flow, and the original roughness of the ceramic protective layer is retained at at least one second location on the surface of the side where there is a risk of detachment of the hot gas flow.

7. The gas turbine part as claimed in claim 6, wherein the roughness of the ceramic protective layer is reduced at the first location to at most ⅓ of the original average roughness.

8. The gas turbine part as claimed in claim 6, wherein the gas turbine part is a gas turbine blade or vane having a suction side and a pressure side, and the roughness of the ceramic protective layer is retained only at at least one location on the surface of the suction side or pressure side of the turbine blade or vane which is remote from a hot gas flow and is at risk of detachment, and the roughness of the remaining surface area of the ceramic layer on the surface of the suction side or pressure side of the blade or vane is reduced.

9. The gas turbine part as claimed in claim 8, wherein the roughness of the ceramic protective layer is retained at various, unlinked locations on the surface of the suction side or pressure side of the turbine blade or vane, and the roughness of the remaining surface of the suction side or pressure side of the ceramic layer is reduced between these locations.

10. The gas turbine part as claimed in claim 6, wherein the gas turbine part is coated with Y-stabilized Zr oxide.

* * * * *